(12) United States Patent
Yu et al.

(10) Patent No.: US 7,738,339 B2
(45) Date of Patent: Jun. 15, 2010

(54) DATA RECORDING DEVICES AND METHODS THEREOF

(75) Inventors: Chih-Ching Yu, Hsinchu (TW);
Ying-Feng Huang, Chia-Yi Hsien (TW);
Ming-Tsang Wu, Taipei County (TW);
Ping-Tsai Tsai, Kaohsiung (TW)

(73) Assignee: Mediatek Inc., Hsin-Chu (TW)

( * ) Notice: Subject to any disclaimer, the term of this patent is extended or adjusted under 35 U.S.C. 154(b) by 679 days.

(21) Appl. No.: 11/563,725

(22) Filed: Nov. 28, 2006

(65) Prior Publication Data
US 2008/0123501 A1    May 29, 2008

(51) Int. Cl.
*G11B 20/14*    (2006.01)
*H04N 7/167*    (2006.01)

(52) U.S. Cl. .................................. 369/59.24; 380/210

(58) Field of Classification Search ............... 369/59.24
See application file for complete search history.

(56) References Cited

U.S. PATENT DOCUMENTS

| | | | |
|---|---|---|---|
| 5,917,857 A * | 6/1999 | Tanaka et al. | 375/253 |
| 2002/0106083 A1 * | 8/2002 | Yamamuro | 380/210 |
| 2004/0001404 A1 * | 1/2004 | Ambe | 369/47.35 |
| 2004/0145984 A1 * | 7/2004 | Kadokawa et al. | 369/47.35 |

* cited by examiner

*Primary Examiner*—Daniell L Negrón
*Assistant Examiner*—Nicholas Lee
(74) *Attorney, Agent, or Firm*—Thomas, Kayden, Horstemeyer & Risley

(57) ABSTRACT

A data recording device. A random data generator randomly generates substitute data. A recording data generator receives original data and a recording address from a host, receives the substitute data, compares the recording address with a reference address, and outputs the substitute data according to the comparison result. An encoder generates a first data block according to the substitute data. A modulator modulates the first data block. An optical pickup records the modulated first data block on the optical recording medium according to the recording address.

18 Claims, 6 Drawing Sheets

DATA RECORDING DEVICES AND METHODS THEREOF

BACKGROUND OF THE INVENTION

1. Field of the Invention

The invention relates to methods and apparatus for recording data onto an optical recording medium, and more particularly to methods and apparatus for selecting data input sources according to the destination address of an optical recording medium.

2. Description of the Related Art

For application of data rewritable optical discs, such as DVD (Digital Versatile Disc)-RAM (Random Access Memory), DVD-RW (Rewritable), and the like, data is written to a different format according to the type of optical recording medium. For example, to record data to a DVD-RAM recordable optical recording medium, user data is processed as a data sector, a record sector and an error correction code (ECC) block. The data sector, of 2064 bytes, includes 2048-byte main data and 16-byte ID record parts recording sector information or the like. The user data is written to the main data part.

The record sector generated by writing data to the main data part is scrambled and added with error correction codes. The ECC block composed of 16 record sectors is modulated in an eight to fourteen modulation (EFM) plus method and a synchronous signal is added to the modulated data. In the EFM plus method, the current 8 bit data is modulated to a 16 bit data according to a previous state. Accordingly, the modulated data of the ECC block generated from the user data is recorded to the recordable optical recording medium.

FIG. 1 shows construction of a data sector. The data sector includes 12 rows of a main data part, and an ID record part consisting of 12 bytes at the starting portion of the first row of the main data part and 4 bytes at the ending portion of the 12th row of the main data part. Each row of the main data part includes 172 bytes. Since the first row includes the 12 byte ID record part, the main data part is 160 bytes, and since the 12th row includes the 4 byte ID record part, the main data part is 168 bytes.

A 4 byte data ID (Identification), a 2 byte IDE (ID Error detection code), a 6 byte RSV (Reverse) and a 4 byte EDC (Error Detection Code) are written to the ID record part. Information such as the sector number or a sector layer or area is written to the data ID. A parity bit detecting errors in the data ID is written to the IDE. Information such as copy prevention information is written to the RSV. A parity bit detecting an error of the whole sector is written to the EDC. The user data is written to the 2048 byte main data. The record sector with this structure is generated as the data is scrambled and an error correction code added thereto.

FIG. 2 shows construction of a record sector. As shown in FIG. 2, the record sector has 13 rows and each row has 182 bytes. An error correction code (ECC) is inserted as the last 10 bytes of each row. Accordingly, the record sector is modulated, for example, using an EFM plus method, and when a synchronous signal is added to the modulated data, a physical sector as shown in FIG. 3 is generated.

FIG. 3 shows construction of a physical sector. As shown, the physical sector has 13 rows, and having 2976 bytes. The physical sector is generated as the record sector is modulated by the EFM plus method and a 4 byte synchronous signal (SY) is added for every 1456 bytes of the modulated data. Here, 16 physical sectors form an ECC block, a basic data unit to be written to the DVD disc. The EFM plus modulation is performed to reduce a high frequency component of a record pulse and to restrain a DC component. The 4 byte synchronous signal (SY) is inserted for every 182 bytes of the EFM plus modulated data. Thus, two synchronous signals (SY) are inserted in each row consisting of 372 bytes. The data of the generated physical sector is NRZI (Non Return to Zero Inversion) converted and sequentially written to the recordable optical recording medium, as indicated by a dotted line.

During recording, as digital data is to be recorded, data as a long run of only one of two values, symmetry of RF (Radio Frequency) signals read upon reproduction is lost, thus adversely influencing various servo systems. For this reason, digital data to be recorded undergoes a scramble process based on a scramble pattern generated by a pseudo random number generator or the like, so as to control one and the other values of data to have nearly equal frequencies of generation upon recording.

On the other hand, in the DVD format, digital data to be recorded is segmented into predetermined reference units called sectors, and is written to an optical disc while assigning addresses for respective sectors. In this case, the scramble process for digital data to be recorded is performed for each sector, and scramble patterns to be used are permanently determined for respective addresses.

In the DVD specification, reserve data segments, user-defined data area and buffer zones in an ECC block, are usually undefined data or all set as default value "0x00". Thus, identical EFM plus modulated data is generated when writing identical main data to the optical disc because the scramble key is determined according to the sector of the physical address. Thus, the rewrite life of the optical disc on which data is recorded using phase change marks may be impaired upon repeated writing of identical main data to identical addresses of the optical disc.

BRIEF SUMMARY OF THE INVENTION

Data recording devices and methods are provided. An exemplary embodiment of a data recording device for an optical recording medium comprises a random data generator randomly generating substitute data, a recording data generator receiving original data and a recording address from a host, receiving the substitute data, comparing the recording address with a reference address, and outputting the substitute data according to the comparison result, an encoder generating a first data block according to the substitute data, a modulator modulating the first data block, and an optical pickup writing the modulated first data block to the optical recording medium according to the recording address.

An exemplary embodiment of a data recording method for use with an optical recording medium comprises receiving a recording address from a host, comparing the recording address with a reference address, randomly generating substitute data according to the comparison result, generating a first data block according to the substitute data, modulating the first data block, and writing the modulated first data block to the optical recording medium according to the recording address.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 4:
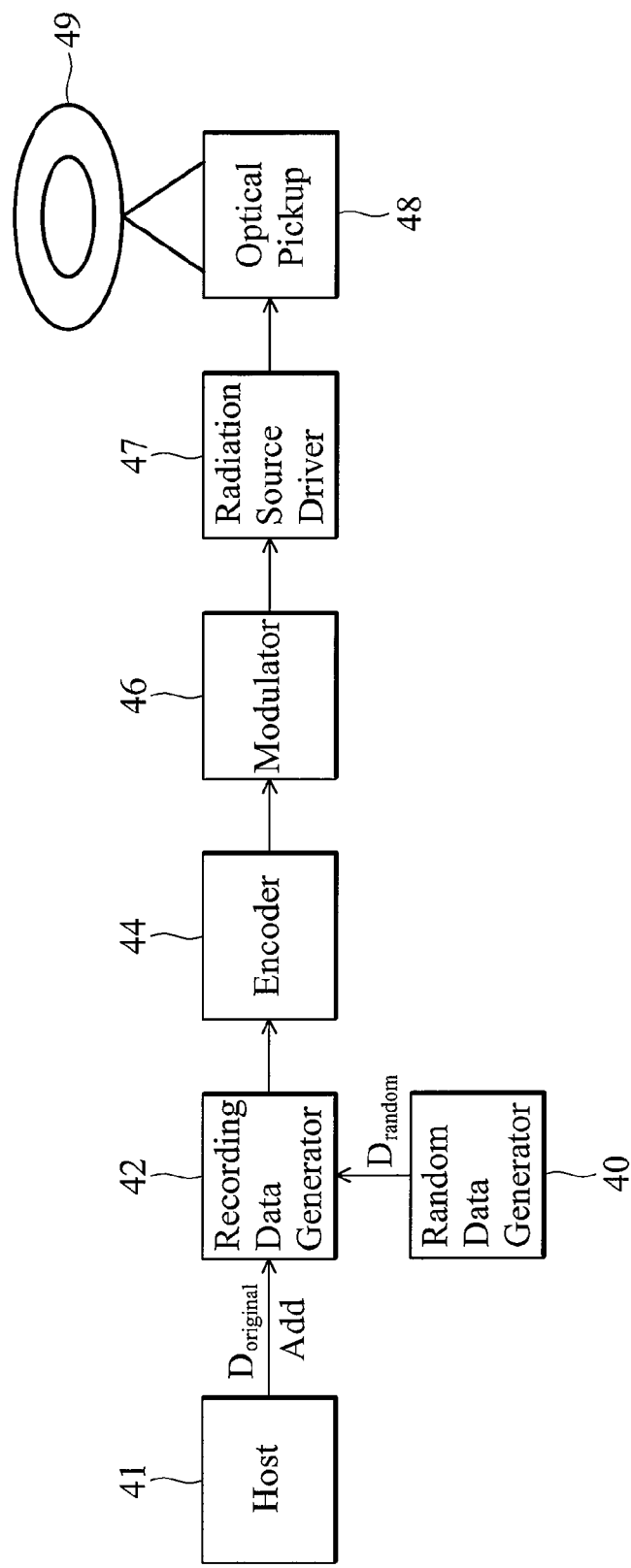
FIG. 4 is a block diagram of a data recording device according to an embodiment of the invention.

FIG. 4 is a block diagram of a data recording device according to an embodiment of the invention. A random data generator 40 randomly generates substitute data $D_{random}$, comprising irregular values. In another embodiment, substitute data $D_{random}$ can be generated by random selection from a group of fixed patterns, for example, patterns 0xAAAA, 0x1111, 0xAA55, and 0x5555, or by selecting the fixed patterns from the group in sequence.

A recording data generator 42 receives original data $D_{original}$ and a recording address Add from a host 41, receives substitute data $D_{random}$, compares recording address Add with a reference address Ref, and outputs substitute data $D_{random}$ according to the comparison result. In DVD specification, areas are defined for storage of reserve data and user-defined data. Thus, the reference address Ref can be set according to the recording address corresponding to the data area for storing reserve data and user-defined data.

In an embodiment of the invention, recording data generator 42 outputs substitute data $D_{random}$ when recording address Add matches reference address Ref, and outputs original data $D_{original}$ when recording address Add does not match reference address Ref. As the recording address Add does not match reference address Ref, recording data generator 42 transmits original data $D_{original}$ to encoder 44.

Figure 1:
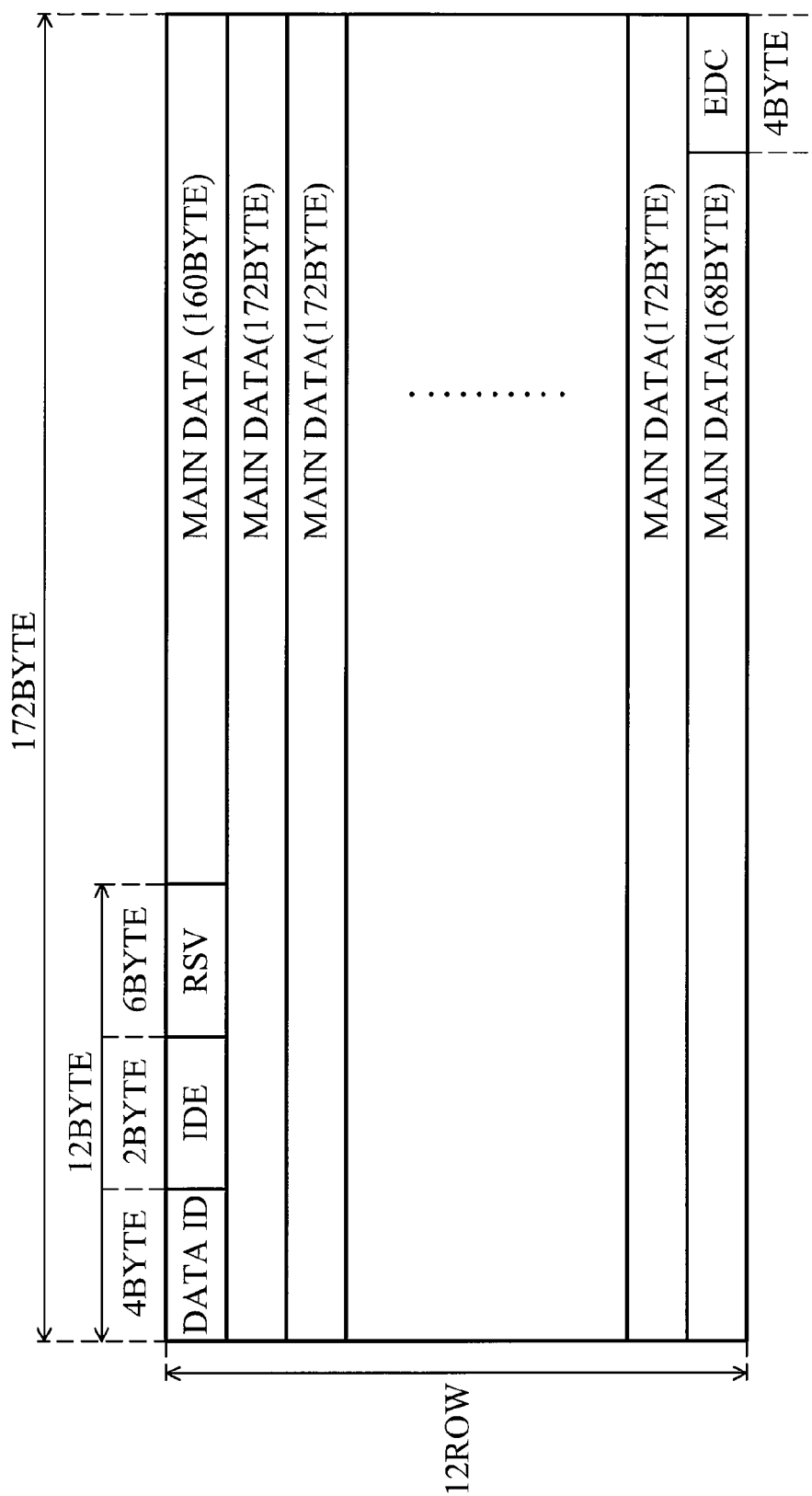
FIG. 1 shows the construction of a conventional data sector.
Figure 2:
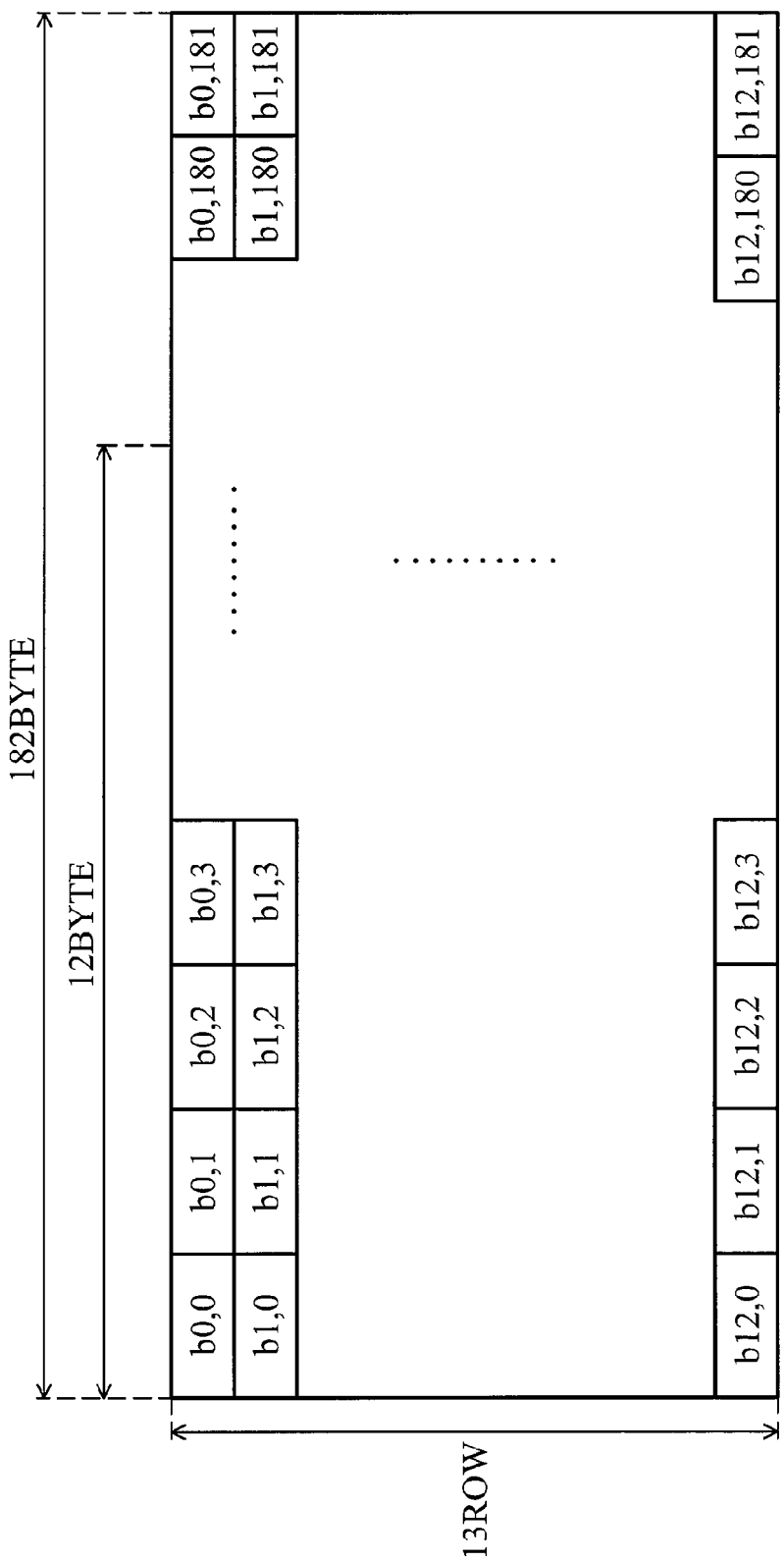
FIG. 2 shows a conventional record sector.
Figure 3:
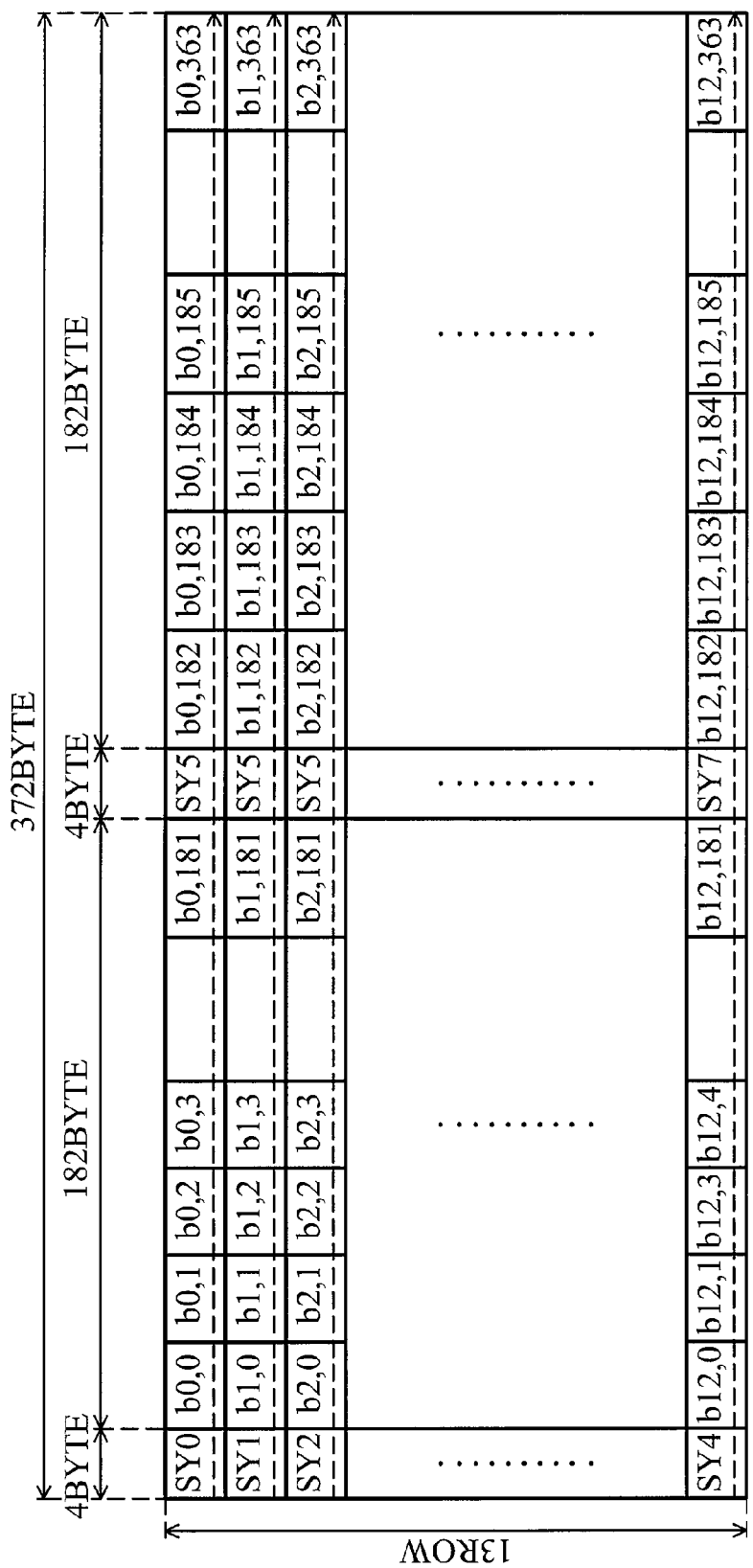
FIG. 3 shows a conventional physical sector.

An encoder 44 generates data sectors according to the data received from recording data generator 42, and generates a data block (ECC block or ECC blocks) according to the generated data sectors. For example, the generated data block may comprise substitute data $D_{random}$ when the recording address Add matches reference address Ref, and comprise original data $D_{original}$ when recording address Add does not match. The data structure of the data block comprises a predetermined number of byte units arranged in a preset number of rows and columns, and comprises a main data part and an error correction code part, and the main data part comprises data information and the data received from recording data generator 42. The data block is structured as shown in FIGS. 1~3, with 16 data sectors forming a data block, a basic data unit to be written to the DVD disc in DVD specification. In addition, before generating the data block, encoder 44 further scrambles the data sector and adds error correction codes thereto.

A modulator 46 modulates the data block output from encoder 44 by EFM-plus-modulating, and a radiation source driver 47 drives optical pickup 48 to record data onto optical recording medium 49. Thus, when the data recording device according to an embodiment of the invention records data onto optical recording medium 49 corresponding to the reference address Ref, different modulated data is generated because random data is introduced, avoiding repeatedly writing identical data on the same physical address on the optical recording medium.

Figure 5:
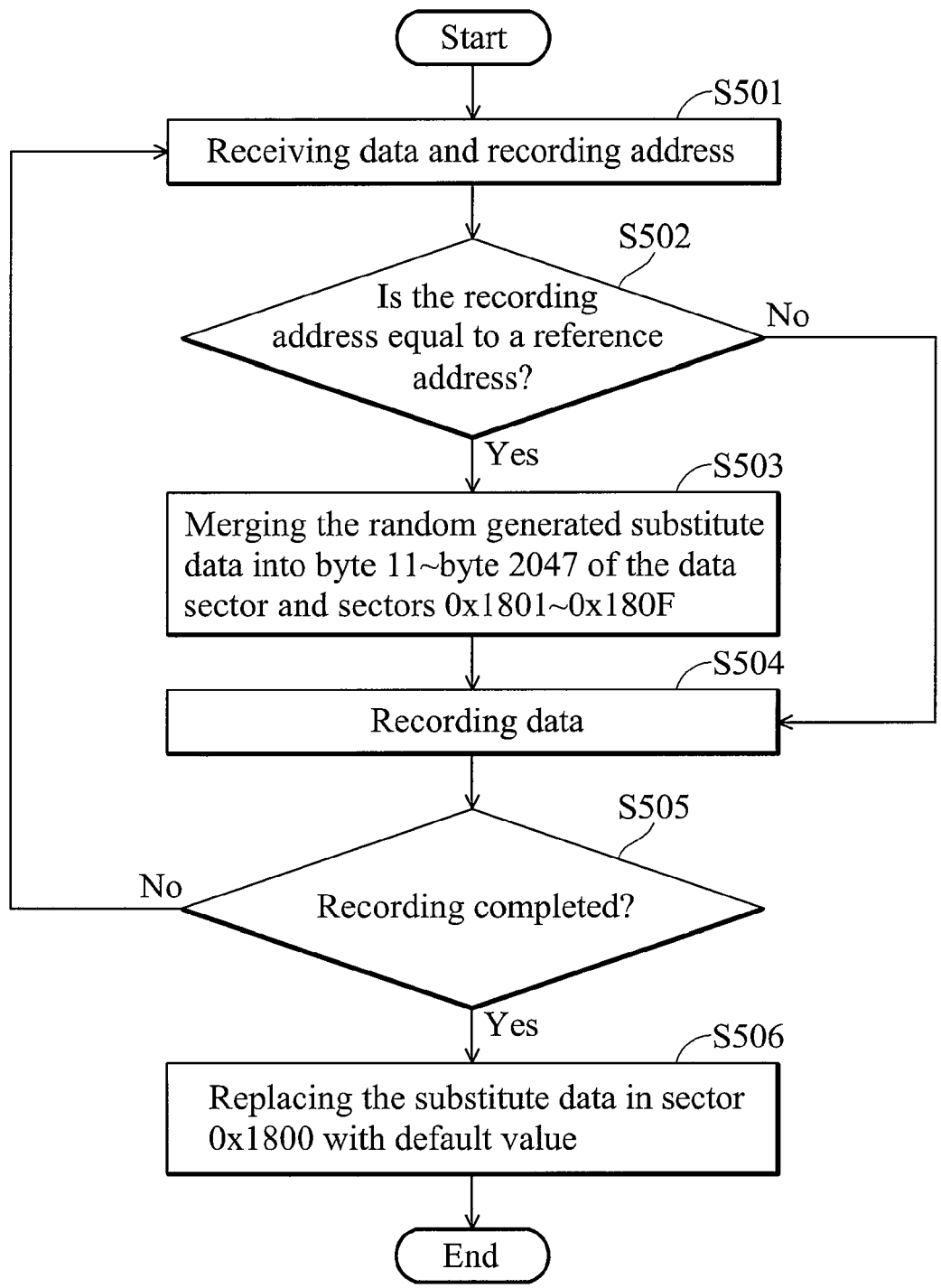
FIG. 5 is a flowchart of a data recording method according to an embodiment of the invention.

FIG. 5 shows a flowchart of a data recording method according to an embodiment of the invention. Here, a recovery mark recording is detailed as an example. A data sector structure of a recovery mark comprises 8 byte recovery mark descriptor (byte 0 to byte 7), 2 byte current title number (byte 8 to byte 9), 1 byte recording quality (byte 10), and 2037 byte reserve data (byte 11 to byte 2047). In addition, recording address of recovery mark is 0x1800, with 2037 byte reserve data is usually set as default value 0x00.

First, data to be recorded and recording address thereof are received from a host (S501). Next, the recording address is compared with a reference address (S502). As described, recording address of recovery mark is 0x1800, so the reference address is preset as 0x1800. Thus, a recovery mark is detected when the recording address matches the reference address. If the recording address matches the reference address, the random generated substitute data is merged into byte 11~byte 2047 of the data sector (S503). In addition, since a basic recording unit is a data block, including 16 data sectors, the random generated substitute data is also merged in data sectors corresponding to recording addresses 0x1801~0x180F to generate a data block available to be written to. Next, the data block is written to (S504). As the recording address does not match the reference address determined in Step S502, the procedure goes to Step S504 directly to record the received data. Next, recording completion is determined (S505). If the recording is not completed, step S501 is repeated, again receiving data and recording address thereof. Thus, the generated EFM-plus-modulated data corresponding to identical physical address is different, increasing the occurrence of direct overwrite.

In addition, in another embodiment, byte 11 to byte 2047 of the data sector corresponding to address 0x1800 can be recorded again by replacing the substitute data with default value 0x00 to meet standard requirement (S506). In this embodiment, since recorded data in steps S504 and S506 is different, wherein the recorded data is repeatedly switched by the random substitute data and the default fixed data, the occurrence of direct overwrite are still increased.

In another embodiment, some data structures may not large enough to generate a data block, such as data VGMG, video recording management information (VRMI) and video title set information (VTSI) #1-3 in +VR type DVD disc, wherein the recording address of data VGMG can be 0x2000, that of data VRMI can be 0x1200, and VTSI #1-3 can be respectively 0x3800, 0x3A00, and 0x3C00, and the data length of data VGMG can be 6-16 sectors, and that of VTSI #1-3 can be 8-112 sectors. Thus, the random substitute data can be generated to fill the remaining space in order to generate a data block. Due to the introduced random substitute data, the generated EFM-plus-modulated signal corresponding to identical physical address is different, increasing the occurrence of direct overwrite.

Figure 6:
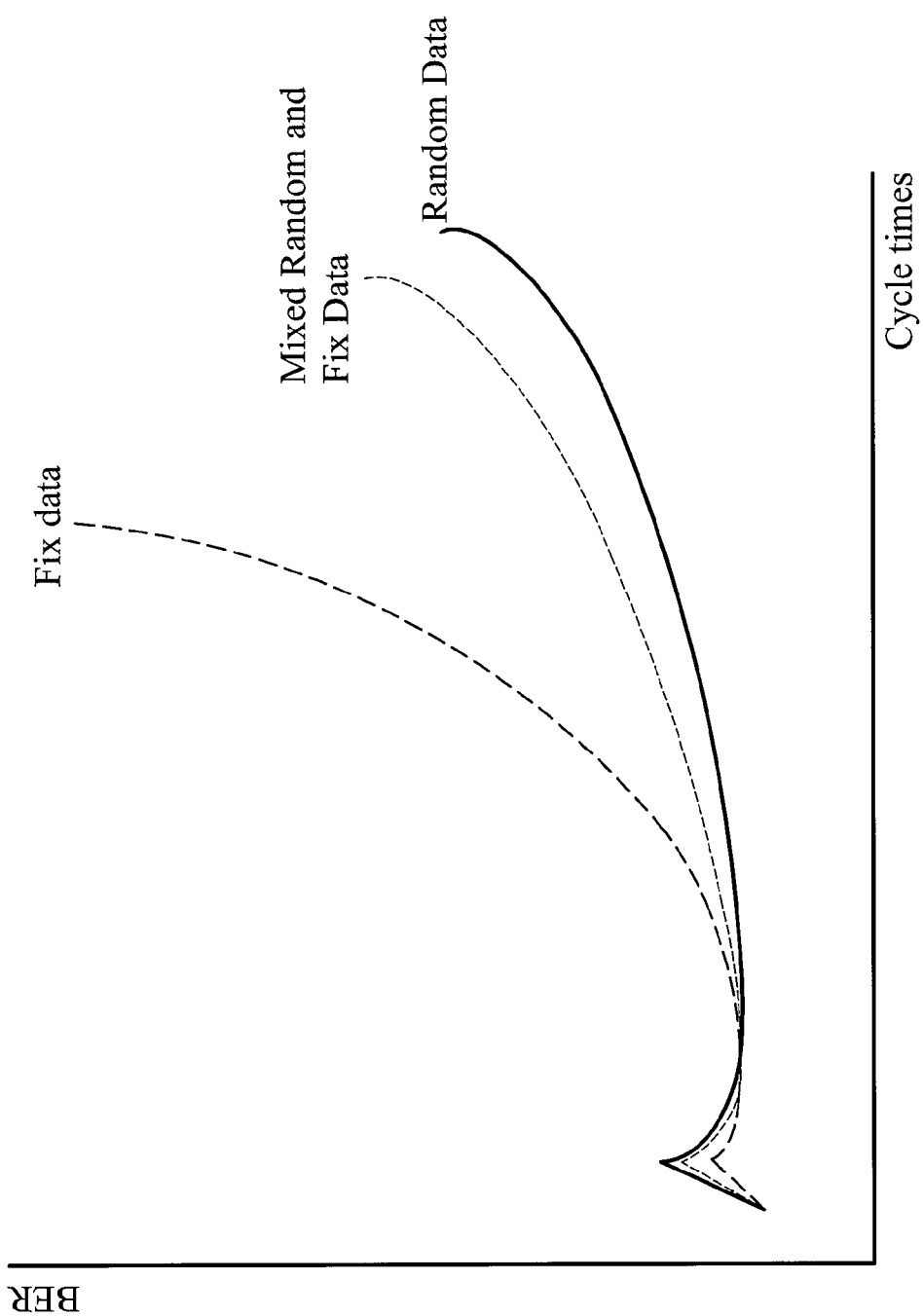
FIG. 6 shows the relationship between bit error rate and cycle times of repeated data writing to an identical physical address using different methods.

FIG. 6 shows the relationship between bit error rate and cycle times of repeated data writing to an identical physical address using different methods. As shown, bit error rate (BER) increases rapidly when repeatedly recording fixed data to an identical physical address, while bit error rate is still low when repeatedly recording mixed random data and fixed data, and random data only as described in the embodiments.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A data recording device for an optical recording medium, comprising:
   a random data generator randomly generating substitute data;
   a recording data generator receiving original data and a recording address from a host, receiving the substitute data, comparing the recording address with a reference address, and outputting the substitute data according to the comparison result;
   an encoder generating a first data block according to the substitute data,
   a modulator modulating the first data block; and
   an optical pickup writing the modulated first data block to the optical recording medium according to the recording address.

2. The data recording device as claimed in claim 1, wherein the encoder further generates a second data block according to predetermined data, the modulator further modulates the second data block, and the optical pickup records the modulated second data block to the optical recording medium according to the recording address after writing the modulated first data block.

3. The data recording device as claimed in claim 2, wherein the second data block comprises a predetermined number of byte units arranged in a preset number of rows and columns, the second data block comprises a main data part and an error correction code part, and the main data part comprises data information and the predetermined data.

4. The data recording device as claimed in claim 1, wherein the recording data generator outputs the substitute data when the recording address matches the reference address.

5. The data recording device as claimed in claim 1, wherein the recording data generator outputs the original data when the recording address does not match the reference address.

6. The data recording device as claimed in claim 5, wherein the encoder further generates a third data block according to the original data, the modulator further modulates the third data block, and the optical pickup records the modulated third data block to the optical recording medium according to the recording address.

7. The data recording device as claimed in claim 1, wherein the first data block comprises a predetermined number of byte units arranged in a preset number of rows and columns, the first data block comprises a main data part and an error correction code part, and the main data part comprises data information and the substitute data.

8. The data recording device as claimed in claim 1, wherein the encoder further generates a fourth data block different with the first data block, the modulator further modulates the fourth data block, and the optical pickup records the modulated fourth data block to the optical recording medium when the recording address of the fourth data block is the same with that of the first data block.

9. The data recording device as claimed in claim 1, wherein the first data block is modulated by an eight to fourteen modulation plus method, and wherein 8-bit data is modulated to 16-bit data.

10. The data recording device as claimed in claim 1, wherein the substitute data is generated by randomly selecting from a group of fixed patterns.

11. A data recording method for use with an optical recording medium, comprising:
    receiving a recording address from a host;
    comparing the recording address with a reference address;
    randomly generating substitute data according to the comparison result;
    generating a first data block according to the substitute data;
    modulating the first data block; and
    writing the modulated first data block to the optical recording medium according to the recording address.

12. The data recording method as claimed in claim 11, further comprising:
    generating a second data block according to predetermined data;
    modulating the second data block; and
    recording the modulated second data block on the optical recording medium according to the recording address after writing the modulated first data block.

13. The data recording method as claimed in claim 12, wherein the second data block comprises a predetermined number of byte units arranged in a preset number of rows and columns, the second data block comprises a main data part and an error correction code part, and the main data part comprises data information and the predetermined data.

14. The data recording method as claimed in claim 11, further comprising:
    generating a third data block according to the original data when the recording address does not match the reference address;
    modulating the third data block; and
    recording the modulated third data block to the optical recording medium according to the recording address.

15. The data recording method as claimed in claim 11, wherein the first data block comprises a predetermined number of byte units arranged in a preset number of rows and columns, the first data block comprises a main data part and an error correction code part, and the main data part comprises data information and the substitute data.

16. The data recording method as claimed in claim 11, further comprising generating a fourth data block different with the first data block, modulating the fourth data block, and recording the modulated fourth data block to the optical recording medium when the recording address of the fourth data block is the same with that of the first data block.

17. The data recording method as claimed in claim 11, wherein the first data block is modulated by an eight to fourteen modulation plus method, and wherein 8-bit data is modulated to 16-bit data.

18. The data recording method as claimed in claim 11, wherein the substitute data is generated by random selection from a group of fixed patterns.

* * * * *